United States Patent [19]

Fredholm et al.

[11] Patent Number: 5,676,721

[45] Date of Patent: Oct. 14, 1997

[54] METHOD AND APPARATUS FOR MOLDING GLASS

[75] Inventors: Allan M. Fredholm, Mennecy; Gilbert D. Pujol, Dammarie Les Lys, both of France

[73] Assignee: Corning Incorporated, Corning, N.Y.

[21] Appl. No.: 502,518

[22] Filed: Jul. 14, 1995

[30] Foreign Application Priority Data

Apr. 7, 1995 [EP] European Pat. Off. .............. 95400785

[51] Int. Cl.$^6$ .................... C03B 9/14; C03B 9/16; C03B 9/20

[52] U.S. Cl. .................. 65/68; 65/82; 65/307; 65/308

[58] Field of Search ................ 65/66, 68, 82, 65/83, 307, 308

[56] References Cited

U.S. PATENT DOCUMENTS

| | | |
|---|---|---|
| 1,708,899 | 4/1929 | Roberts . |
| 1,801,613 | 4/1931 | Ratzer . |
| 1,906,640 | 5/1933 | Shivek . |
| 2,328,662 | 9/1943 | Meredith et al. . |
| 2,789,332 | 4/1957 | Scott . |
| 3,030,668 | 4/1962 | Taylor . |
| 3,807,915 | 4/1974 | Rees . |
| 3,942,755 | 3/1976 | Robinson . |
| 4,082,527 | 4/1978 | Jones et al. .................. 65/83 |
| 4,179,254 | 12/1979 | Brown . |
| 4,280,976 | 7/1981 | von Holdt . |
| 4,983,346 | 1/1991 | Curliss et al. . |
| 5,340,304 | 8/1994 | Nakamura . |
| 5,411,564 | 5/1995 | Bolin .................. 65/68 |
| 5,498,274 | 3/1996 | Matsumoto et al. .................. 65/80 |

Primary Examiner—Donald E. Czaja
Assistant Examiner—Jacqueline A. Ruller
Attorney, Agent, or Firm—Robert L. Carlson

[57] ABSTRACT

A method and apparatus for pressing glass articles. A single mold may be utilized for each article being pressed. The plunger has a ring-like member movably attached thereto. After pressing, when the plunger is retracted from the plunger, the plunger retains the glass article thereon. The ring-like member is then lowered relative to the plunger, thereby removing the pressed article therefrom.

23 Claims, 3 Drawing Sheets

METHOD AND APPARATUS FOR MOLDING GLASS

FIELD OF THE INVENTION

The invention relates to a method and apparatus for molding glass objects.

BACKGROUND OF THE INVENTION

Machines employing a series of molds and plungers in various configurations for molding glass objects are well known. They typically consist of a rotating table or continuous conveyor system having a plurality of mold supports which carry respective molds for the manufacture of glass articles. The table transports the mold through a number of stations. At one station, a charge of molten glass is placed in the mold. The mold is then transported to at least one pressing station, where a plunger is inserted into the mold to press the glass gob into the mold. The mold is then transported to a number of cooling stations, after which the molded article is extracted from the mold.

One problem with such processes is that they require a relatively large number of molds. For example, one commercial process for making pressed glass hollow wares (such as bowls, casserole dishes, and the like) employs a charging station, a pressing station, seven article cooling stations, an extracting station, and six mold cooling stations. This process (hereinafter the multi-mold process) typically utilizes a set of about 24 molds for each product produced, 16 of which are in use at any one time, the other 8 being kept for repairs, spares, or constantly being preheated to be ready for use if needed. Consequently, the molds in such processes can result in a relatively large expense, as both the initial manufacturing costs as well as the costs associated with maintaining such molds can be substantial. Additionally, the number of pieces pressed per minute for each mold will be relatively low (about 1.5 pieces/min/mold for a 900 g. Pyrex casserole dish).

Because of the high cost associated with each mold, having a process which requires a large number of molds decreases the flexibility of the molding process. For example, for each product which is to be produced using the multi-mold process described above, a complete set of 16 to 24 molds must be made for each particular ware design. Consequently, many low volume products are avoided because of the high cost of making and maintaining the large number of molds required.

It would therefore be desirable to design a glass molding process which requires fewer molds but can still achieve manufacturing outputs comparable or better than that of prior art manufacturing processes, such as the multi-mold process. Such a process would contravene most prior art methods for press molding, which instead utilized large numbers of molds. Indeed, before the present invention, it was thought that reducing the number of molds per process would necessarily also decrease process efficiency.

SUMMARY OF THE INVENTION

The present invention relates to a method for press forming formable material such as glass or glass-ceramic materials. The formable material is placed into a female mold. The female mold is then moved to a pressing station and into alignment with a plunger. The plunger presses the formable material into a formed article by movement of the plunger into the female mold. When the plunger is removed from the mold cavity, the pressed article preferably is retained on the plunger, thereby removing the pressed article from the mold cavity.

Preferably, the plunger comprises a movable ring member movably attached thereto. The mold cavity preferably is defined by the ring member, the plunger, and a female mold member. Prior to removal of the pressed article from the mold cavity, the ring member preferably is locked to the plunger, so that the ring member travels with the plunger. In this way, the ring member remains in contact with said formed article both during and after pressing, thereby facilitating removal of the ware via retraction of the plunger.

The glass gob is typically delivered to the female mold in a viscosity range of between about 1,000 and 10,000 poises, more preferably 2,000 and 5,000 poises. In the present invention, the glass is preferably pressed for a long time, compared to prior art techniques. For example, the press dwell time is typically greater than 3 seconds, and more preferably greater than 4 seconds. Preferably, during these relatively long pressing operations, the glass temperatures cool to a temperature which equates to a viscosity of at least $10^7$ poises, more preferably to a temperature which equates to a viscosity of at least $10^{7.6}$ and most preferably to a viscosity of about $10^{8.5}$ or more. Of course, the exact viscosity desired at the end of the pressing cycle will depend on several factors, including the size and shape of the ware to be pressed, as well as the accuracy needed or desired from the pressing operation. Cooling the glass sufficiently will in many cases aid the plunger in removing the formed article from the mold after the pressing operation, as the cooling glass will tend to contract around the plunger as it cools. This can prove to be particularly advantageous for pieces which have sidewalls, such as casserole dishes or bowls.

In many cases it may be desirable to facilitate removal of the glass piece by employing vacuum holes in the plunger or ring member or by applying a vacuum in the space between the ring and the plunger, and applying this vacuum to the pressed ware during the removal operation. Operations which include vacuum are particularly desirable for larger molded pieces, especially those greater than about 500 grams, as well as wares which do not have sidewalls, such as flat or relatively flat plates.

Another aspect of the present invention relates to utilizing a plurality of the pressing stations described above disposed around a single gob feeding station. For example, a single gob feeding station can be used to distribute molten glass gobs to the plurality of pressing stations seriatim, and each of the pressing stations operated to accomplish their respective pressing operations seriatim. Thus, while one pressing station is undergoing a pressing operation, another pressing station is undergoing a cooling operation. In this way, a single gob discharge station can be used to supply glass to multiple pressing stations, enabling production outputs comparable or exceeding those achieved using prior art processes, while employing fewer molds than were employed in such prior art processes. Each pressing station would employ a plunger capable of removing the pressed article form the female mold after completion of the pressing operation.

The methods and apparatus in accordance with the present invention are useful in forming most glass article shapes which can be obtained by conventional pressing, including round, oval, and rectangular shapes, with or without integral handles.

The methods of the present invention result in a number of advantages over prior art methods for molding glass articles. For example, the methods and apparatus of the present invention can be utilized to produce pressed glassware using fewer molds than prior art operations, while maintaining the same output (pieces per minute), and greatly reducing the costs associated with mold manufacturing and mold maintenance.

In addition, having fewer molds greatly increases the flexibility of the manufacturing process. For example, in the present invention, a single mold can be employed for each different design of ware, rather than requiring a large number of molds for each design. Consequently, even low volume ware designs can be made economically.

DETAILED DESCRIPTION OF THE INVENTION

Figure 1A:
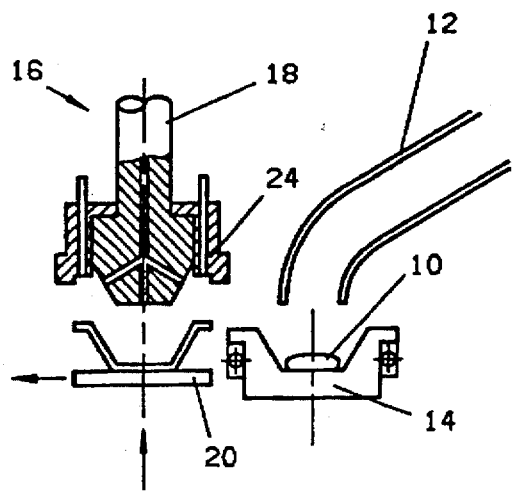
FIGS. 1a–1d illustrate a method and apparatus in accordance with the present invention.

One embodiment of a molding process in accordance with the present invention is illustrated in FIGS. 1a through 1d. As illustrated in FIG. 1a, a charge or gob of molten glass 10 is delivered through glass gob delivery chute 12 to female mold member 14. At the same time, a ware support 20 carrying the previously pressed glass article is being removed from pressing station 16 and moved to cooling station 22.

Figure 1B:
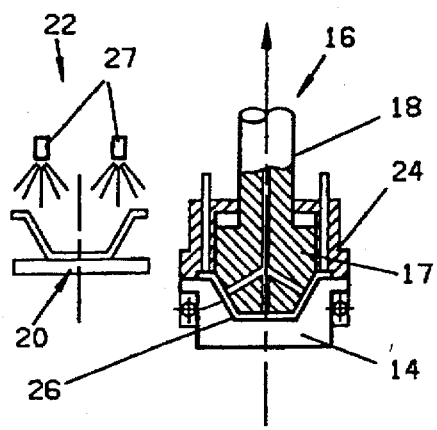

After female mold member 14 has been moved to pressing station 16, it is aligned with and positioned for pressing by plunger 17 which is carried by a pressing ram 18, as illustrated in FIG. 1b. The plunger 17 in accordance with the present invention preferably comprises a ring-like member 24 movable in relation thereto. The ring-like member 24 acts as a seal between the female mold 14 and the plunger 17 during the pressing operation, and also aids in retaining the molded article to the plunger 17 after the pressing operation.

Prior to pressing, as illustrated in FIG. 1a, ring 24 is at a position relative to the plunger 17 which is lower than the position it will take during pressing. During pressing, ring 24 moves upwardly relative to plunger 17. Immediately after pressing (i.e., during the retraction of plunger 17 from the mold cavity), ring 24 is retained in the same relatively upward location achieved during the pressing operation. This serves to increase the surface area contacting the pressed ware, and thereby facilitates removal of the pressed ware from the mold cavity. Then, if needed, ring 24 can be moved downwardly relative to plunger 17 to help remove the ware therefrom.

FIG. 1b illustrates the pressing operation. Female mold 14 has been accurately positioned under plunger 17, and pressing ram 18 is moved downwardly to press plunger 17 into the molten glass charge 10, spreading the molten glass gob inside the mold cavity formed by plunger 17, ring member 24, and female mold member 14. Preferably, the glass charge completely fills the mold cavity during the pressing operation.

During the downward travel of the plunger 17, ring 24 contacts the top of the female mold 14, stopping downward travel of ring 24. While ring 24 remains pressed against the female mold during the pressing operation, ram 18 continues moving the plunger 17 down until the glass has filled the mold cavity which is formed by female mold 14, plunger 17 and ring 24.

The cycle time of the molding operation depends mainly on pressing time. For a 900 g borosilicate Pyrex® casserole dish, the required time press time is approximately 4.5 seconds. Press time, as Used herein, means the dwell time of the glass within the closed mold cavity after the plunger bas finished its downward stroke, and before the plunger has been retracted. By using a pressing time of 4.5 seconds, a cycle time of approximately 7.5 seconds per pressing station 16 can be obtained, thus providing an output of 8 pieces per minute.

Of course, pressing cycle times will change depending on the shape and composition of the article being formed, and is most dependent on the desired viscosity of the glass to be attained during the pressing step and prior to removal via the plunger 17. For example, glasses with shorter working temperature ranges than Pyrex borosilicate, such as soda-lime-silicate glasses and glass-ceramic compositions, will generally require shorter pressing times.

The glass gob 10 is typically in the range of about 1000 to 10000 poises, more preferably 2000 and 5000 poises, when it is loaded into mold 14 from delivery chute 12. Pressing is maintained until the glass has cooled at least to a viscosity which will allow its release from female mold 14 without unacceptable distortion from the as pressed shape. Preferably, during the pressing operation, the glass temperature is cooled to a glass temperature which equates to a viscosity of at least $10^7$ poises, and more preferably to a temperature which equates to a viscosity of at least $10^{7.6}$, and most preferably to a temperature which equates to a viscosity of about $10^{8.5}$ or more. Of course, If desired or needed, longer press times could be employed, resulting in the glass being cooled to a still lower temperature. Generally, for larger and/or more complex ware designs, a longer press time is preferred. Similarly, for ware designs requiring high dimensional accuracy, longer press times should preferably be employed, for example such as would result in the ware cooling to a viscosity of $10^{7.6}$, and more preferably to a viscosity of about $10^{8.5}$ or more.

In the preferred embodiment, before plunger 17 is retracted from the mold cavity, ring 24 is locked against plunger 17, such as by a suitable mechanical locking means (not shown in FIGS. 1a–1d). By locking, it is meant that the ring member 24 travels with plunger 17 without changing its position relative to plunger 17. The locking means can be any means capable of maintaining ring member 24 in its present position along plunger 17.

Figure 3A:
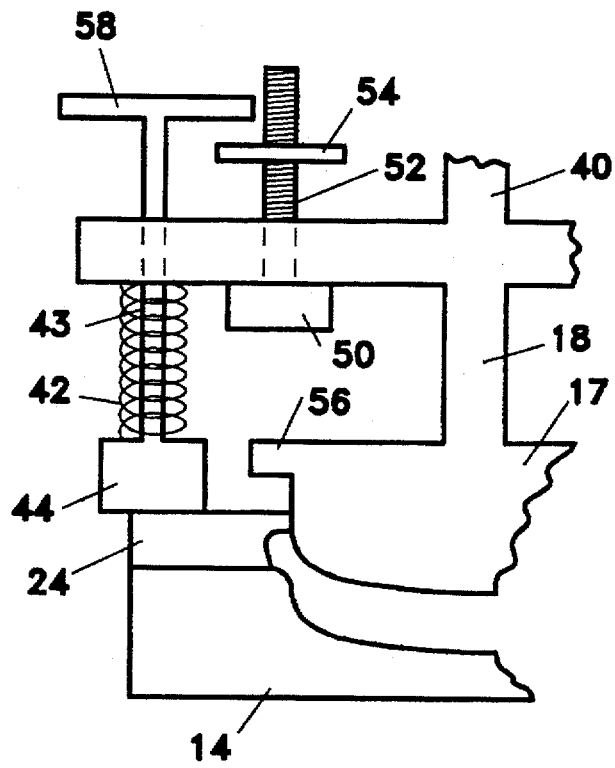
FIGS. 3a and 3b illustrate a preferred plunger in accordance with the present invention.
Figure 3B:
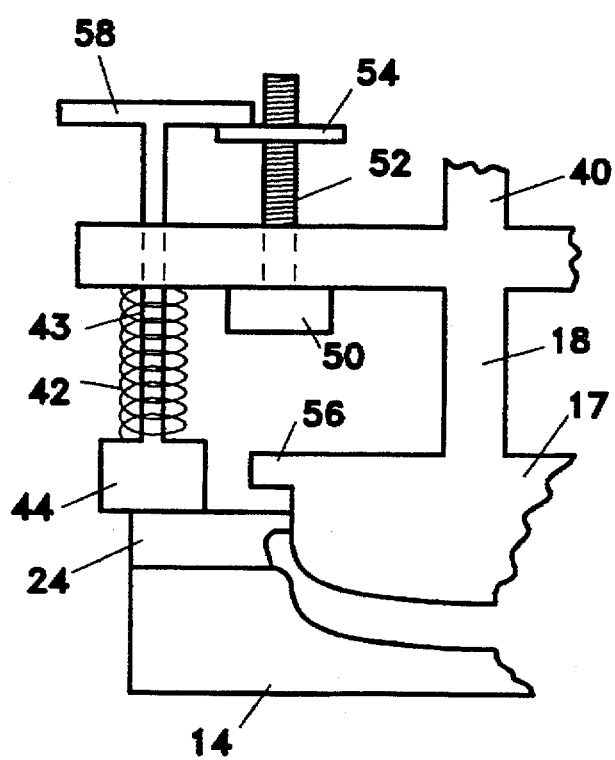

A preferred example of a suitable locking mechanism is illustrated in FIGS. 3a and 3b, both of which illustrate the locking mechanism on one side of a plunger 17. Of course, to facilitate symmetrical and balanced operation of the pressing station, at least one (and perhaps three or more) identical locking mechanisms similar that illustrated in FIGS. 3a and 3b should be symmetrically distributed around opposing sides of plunger 17 (none of which are shown). In the embodiment illustrated in FIGS. 3a and 3b, ram 18 which connects to plunger 17 also has support flange 40 connected thereto. Spring 42 is supported by spring support 43, which is movably attached to support flange 40. One end of spring support 43 is connected to spring stopper 58, and the other end of spring support 43 includes ring contacting portion 44, which is attached via bolts, screws, or other suitable attaching means (none of which are shown), to ring 24. In this way, spring support 43, including spring stopper 58 and ring contacting portion 44, travel with ring 24. Spring 42 is retained between support flange 40 and the ring contacting portion 44 of spring support 43, so that spring 42 applies a downward force to ring 24 through ring contact member 44. Also supported by support flange 40 is motor 50, ball screw 52, and locking plate 54, all of which in combination serve to restrict upward movement of ring 24 relative to plunger 17 and thereby "lock" ring 24 to plunger 17.

In operation, during the downward pressing stroke of ram 18, spring 42 forces ring member 24 (via ring contact member 44) in downward position relative to plunger 17. Travel of ring 24 stops when ring 24 contacts female mold 14, as illustrated in FIG. 3a. Plunger 17 continues to travel downwardly, such that ring member 24 travels upwardly relative to plunger 17, until plunger flange 56 engages ring 24, thereby stopping downward movement of plunger 17, as well as upward movement of ring member 24 relative to plunger 17. In an alternative and preferred embodiment, downward movement of plunger 17 is stopped by the glass filling the mold cavity, rather than by plunger flange 56. After a sufficient dwell time to allow the glass to form and cool, plunger 17 is retracted from the mold cavity. Before plunger 17 is retracted however, locking plate 54 is moved into locking position via screw 52 (which is driven by motor 50) and into contacting position with spring stopper 58 as illustrated in FIG. 3b. Once locking plate 54 contacts spring stopper 58, it is retained in this position by motor 50 and screw 52, thus "locking" the ring 24 to the plunger 17.

By so locking the ring member 24 to plunger 17 before plunger 17 is retracted, ring member 24 retracts along with plunger 17, thereby facilitating removal of the pressed glass from the mold. By then lowering locking plate 54, spring 42 will once again force ring member 24 downwardly relative to plunger 17, thereby removing the pressed ware therefrom. One advantage to utilizing the embodiment of locking mechanism illustrated in FIGS. 3a and 3b is that the ring can be released or lowered gradually by lowering the spring stopper 58 via screw drive 52 and locking plate 54. In this way, the pressed ware can be removed very gently from the plunger 17.

Also illustrated in FIG. 1b, ware holder 20 has carried the previously pressed ware to a cooling station 22. Cooling station 22 may comprise any means for cooling the pressed article, including, for example, air or water cooling. Whereas, in conventional pressing, air (fan or compressed) is typically used to cool molds, in the present invention a more powerful cooling is preferred. Thus, as illustrated, a continuous spray of water can be supplied to the mold 14 via a plurality of water jets 27.

Of course, the invention is not limited to a single cooling station, and alternatively additional cooling stations 22 could be employed if desired. In such cases, a plurality of ware supports 20 could be employed, and a conveyor belt used to transport the ware to be cooled through the various cooling stations. In the example above for the Pyrex casserole dish, the dish is cooled for 4.5 seconds under the water cooling jets 27. However, the cooling time in this case is largely a function of the pressing cycle time, i.e., because the glass is being pressed for 4.5 seconds, 4.5 seconds are available for cooling in a system utilizing a single cooling station.

Figure 1C:
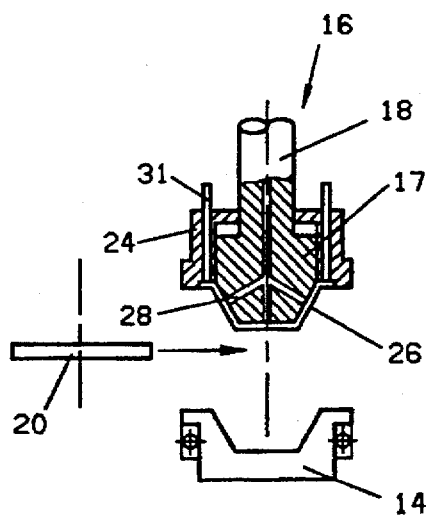

As illustrated in FIG. 1c, after the pressing operation, ring 24 is locked in the same position relative to plunger 17 it had during pressing, and plunger 17 is retracted from the mold cavity. When plunger 17 is retracted, the pressed article 26 is retained against the plunger 17 and ring member 24. Such retaining of the pressed article against plunger 17 can be facilitated using a variety of techniques. As explained earlier, locking the ring 24 to plunger 17 during the retraction of the plunger facilitates removal of the pressed ware from the mold cavity, as locking the ring increases the surface area of the ring and plunger which will contact the pressed glass.

In addition, such removal of the pressed ware 26 can be facilitated by maintaining the temperature of plunger 17 higher than the temperature of female mold member 14, which makes the pressed article 26 more inclined to stick to the plunger 17. Maintaining the plunger and/or ring 24 at a temperature which results in sticking actually contravenes pressing methods of the prior art, as in the past such sticking was viewed as a problem to be avoided. The tendency of the glass to stick to the plunger 17 rather than female mold 14 is facilitated by maintaining the plunger at least 25° C., and more preferably at least 50° C., hotter than the mold 14. The female mold 14 may be kept at a temperature used in conventional pressing, e.g. 400°–500° C. for borosilicate or soda-lime glasses. Thus, for example, if the female mold 14 is kept at an average temperature of about 450° C., the plunger should preferably be kept at an average temperature of at least 475° C., more preferably at a temperature of at least 500° C. Temperature control of plunger 17 and ring 24 can be obtained by circulating air or water therethrough. Given the long cooling times within the mold cavity, the plunger and ring (and their respective cooling systems) should preferably be designed to prevent localized cold temperatures of less than about 400° C. on any of the surfaces which would come in contact with the glass, given the long pressing times used. Retaining the pressed article against plunger 17 can also be facilitated by cooling the pressed article during the relatively long pressing operation, causing pressed article 26 to contract slightly, thereby causing the article 26 to grip plunger 17.

If the pressed article is a large and/or heavy piece of glass, or if the glassware is a relatively flat piece lacking substantial sidewalls, it may be advantageous or in some cases necessary to employ a vacuum means within the plunger 17 or the ring member 24 to aid in retaining the pressed article 26. A wider process window can be obtained and a broader range of glass articles can be produced if a vacuum means is employed to aide in retaining the pressed article. Such vacuum means may consist, for example, of one or more vacuum holes 28 through which a vacuum is applied to the pressed ware 26. Alternatively, the vacuum could be applied between plunger 17 and ring 24, or even through vacuum holes 31 in the surface of ring 24 which contacts the glass. Of course, the use of vacuum is not limited to larger or more complex pieces, but could be used in the manufacture of any pieces, if desired.

As also illustrated in FIG. 1c, the pressed article 26 has been unloaded from ware support 20 to enable support 20 to move under plunger 17 and receive the next pressed article 26. Such unloading of the pressed article 26 can be achieved, for example, using a vacuum cup attached to a suitable support structure (none of which is shown).

Figure 1D:
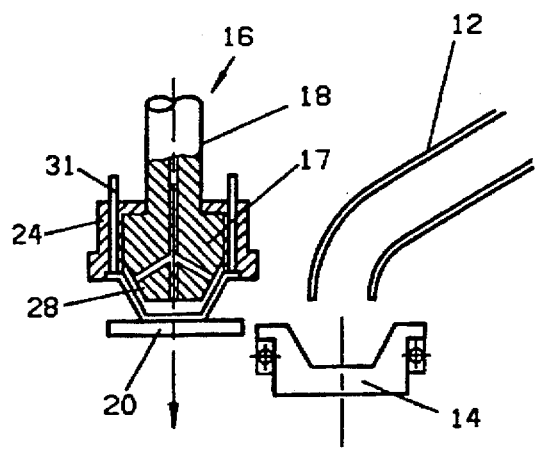

In FIG. 1d, ware support 20 has moved under plunger 17 to receive the next pressed article 26. At the same time, female mold 14 has been moved under gob delivery chute 12 to be loaded with the next charge 10 of molten glass to be pressed. Once ware support 20 is positioned under plunger 17, any vacuum used to retain the article 26 against the plunger 17 or ring member 24 is turned off, and ring 24 is moved downwardly relative to the plunger 17, thereby removing the pressed article 26 from plunger 17 and onto ware support 20. Ware support 20 is then lowered or plunger 17 raised so that the plunger will clear pressed article 26, and then ware support 20 is moved to cooling station 22. The process then repeats.

Figure 2:
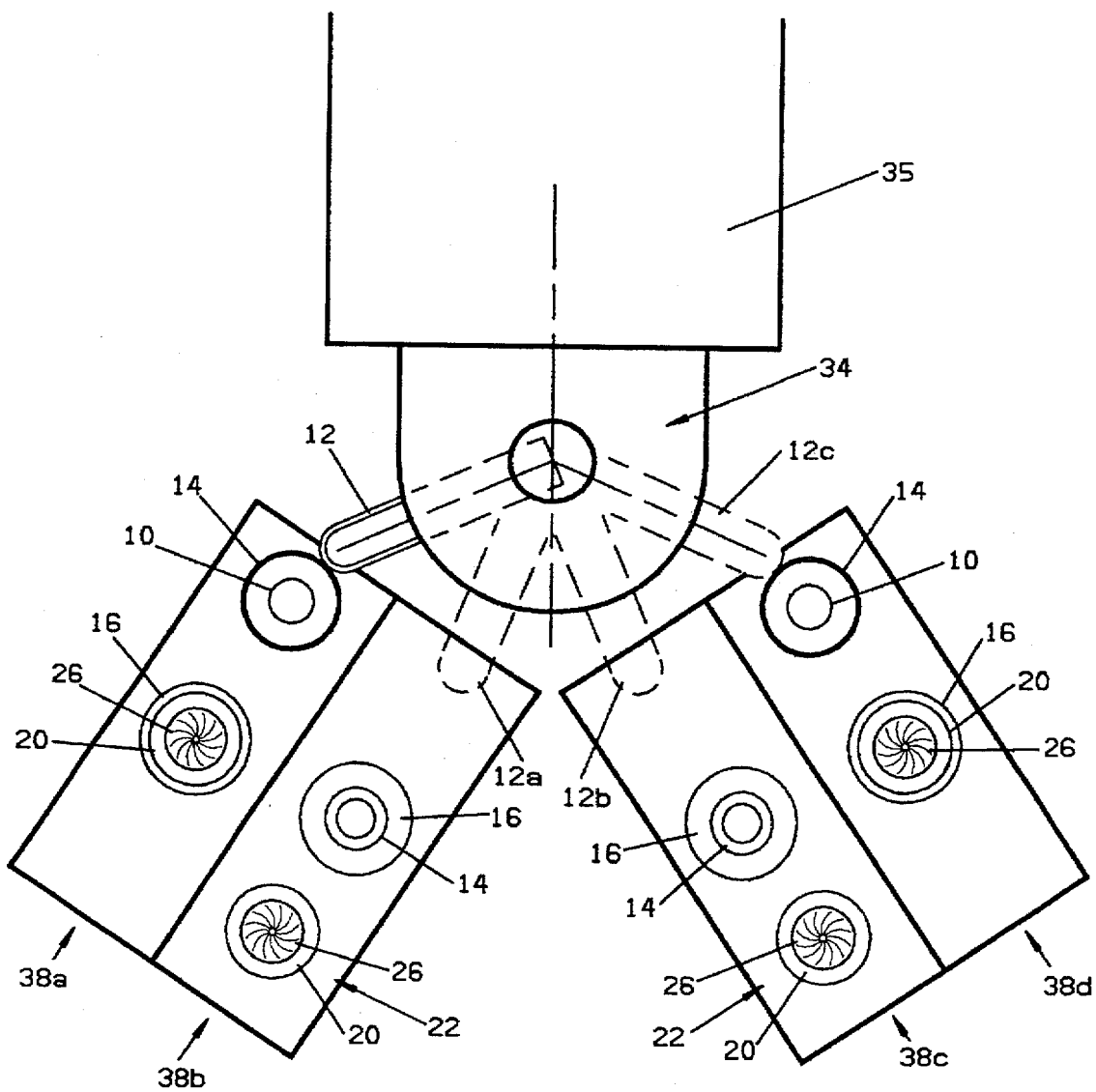
FIG. 2 illustrates an alternative method and apparatus in accordance with the present invention.

FIG. 2 illustrates an alternative embodiment employing four pressing systems 38a, 38b, 38c, and 38d located around a single forehearth 35. In the embodiment illustrated in FIG. 2, each pressing station 38 is identical to the pressing system apparatus illustrated in FIGS. 1a–1d described above.

As illustrated in FIG. 2, gob forming station 34 is located at the end of forehearth 35, which supplies the gob loading station with a steady stream of molten glass. This stream of molten glass is cut into molten glass gobs at the gob loading station by an appropriate set of shears or other cutting device (not shown), as is known in the art. The glass gob 10 falls into gob delivery chute 12, which is rotatable around the gob delivery station to a variety of positions suitable for delivering a molten glass gob 10 to each of the plurality of pressing systems 38a–38d. The operations of these four pressing systems 38a, 38b, 38c, and 38d as illustrated in FIG. 2 correspond to the operations illustrated in FIG. 1a, 1b, 1c, and 1d, respectively.

Thus, in pressing system 38a, which corresponds to the operation illustrated in FIG. 1a, glass gob 10 has just been delivered through glass gob delivery chute 12 to female mold member 14 in pressing system 38a. Female mold member 14 is about to be moved to pressing station 16. Ware support 20 has just received the previously pressed ware from plunger 17 and is preparing to carry the finished glass article out from pressing station 16 to cooling station 22.

At pressing system 38b, which corresponds most closely to the operation illustrated in FIG. 1b, ram 18 has been moved downwardly to press plunger 17 into the molten glass charge 10 and against female mold member 14. The ware support 20 has transported a finished ware to cooling station 22.

At pressing system 38c, which correspond FIG. 1c, the operation illustrated in FIG. 1c, the pressing operation has been completed, and ram 18 and plunger 17 have been retracted from female mold member 14. The pressed article 26 is retained against the plunger 17 and ring member 24.

In pressing system 38d, which corresponds to the operation illustrated in FIG. 1d, ware support 20 is positioned under plunger 17 and is about to receive the pressed article 26. The ring member will move downwardly relative to the plunger 17, releasing the pressed article 26 from the plunger and onto ware support 20. At the same time, female mold member 14 is positioned to receive another glass gob 10 from delivery chute 12.

Although the multipressing station embodiment illustrated in FIG. 2 utilizes four pressing stations 38a–38d, more or less pressing stations could be employed as desired. Preferably, the number of pressing systems 38 is determined to optimize the forehearth glass pulls, i.e., maximize the number of pressing stations 38 that can be employed for the particular forehearth glass flow.

For example, as mentioned above, each pressing station 38 employs a cycle time of about 7.5 sec for a 900 gram borosilicate Pyrex casserole dish (or about 8 pieces/minute/mold, five times more than the multi-mold process per mold. As the typical speed of a conventional 16 mold press for this same glass item is 24 pieces per minute, a multi pressing station process utilizing three pressing stations 38 (3 molds 14, 3 plungers 17 and 3 rings 24) in accordance with the present invention will match the output (pieces/minute) of the conventional 16 mold multi-mold press described above. At the same time, the overall tool set cost and tool maintenance costs have been estimated at ⅔ that of a comparable producing multi-mold.

One of the reasons for this reduced cost is because far fewer molds are employed. In addition, because the molds experience reduced cycle time, e.g. 5 cycles per minute versus 1.5 cycles per minute, they also encounter a narrower temperature variation range. As a consequence, the degree of thermal fatigue is lower and more pieces can be produced in each mold before thermal cracking occurs and necessitates renewal of the mold.

Another advantage to employing a multipressing system such as is illustrated in FIG. 2 is that multiple shape (and even multiple size) objects can be manufactured from the same forehearth and overall manufacturing process. For example, if desired, each pressing system station 38a, 38b, 38c, and 38d in the apparatus illustrated in FIG. 2 can be used to manufacture a different shape and/or size pressed ware.

Such a process is facilitated by employing a gob delivery system which is capable of delivering different sized gobs. Such a gob forming station would cut different sized gobs of molten glass as they emerge from the forehearth. For example, in the multi-press process disclosed in FIG. 2, which employs four pressing stations, three of the stations 38 could be used to produce one type and size of pressware, and the fourth used to produce a different shape of ware requiring a different sized glass gob. Of course, it is also conceivable that all four stations could be employed to press gobs of different sizes, if desired.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method of forming a glass, ceramic, or glass-ceramic article by pressing which comprises:

depositing formable glass, ceramic, or glass-ceramic material into a female mold;

moving said mold to a passing station and into alignment with a plunger which comprises a movable ring member movably attached thereto, said ring member comprising vacuum means thereon;

pressing said formable material into a formed article by moving said plunger toward a mold cavity which is defined by said female mold to form a mold cavity defined by said female mold, said plunger, and said ring; and retracting said plunger from said mold, while maintaining said ring member and said plunger in contact with said formed article, said plunger retaining said article thereon to thereby remove said article from said mold, said retracting step comprising applying said vacuum to facilitate said retaining.

2. The method of claim 1, wherein said plunger further comprises a movable ring member movably attached thereto, and said pressing step comprises pressing said formable material within a mold cavity defined by said ring member, said plunger, and said female mold.

3. The method of claim 1, further comprising, prior to said retracting step, locking said ring member to said plunger.

4. The method of claim 1, further comprising removing said formed article from said plunger.

5. The method of claim 4, wherein said removing step comprises lowering said ring member relative to said plunger.

6. The method of claim 1, wherein said pressing step comprises maintaining said plunger at a temperature which is greater than the mold to retain said article to the plunger during the retracting step.

7. The method of claim 6, wherein said plunger is kept at least 25° C. higher than said mold.

8. The method of claim 6, wherein said plunger is kept at least 50° C. higher than said mold.

9. The method of claim 1, wherein said plunger comprises vacuum means thereon for aiding in retaining said article to said plunger, and said retracting step comprises applying said vacuum to facilitate retaining said article on said plunger.

10. The method of claim 1, wherein said ring member and said plunger comprises vacuum means thereon for aiding in retaining said article to said plunger, and said retracting step comprises applying said vacuum to facilitate retaining said article on said plunger.

11. The method of claim 10, wherein said vacuum means comprises applying said vacuum between said ring member and said plunger to aid in retaining said article to said plunger.

12. A method of forming a glass, ceramic, or glass-ceramic article by pressing which comprises:

depositing formable glass, ceramic or glass-ceramic material at a viscosity of less than about $10^5$ poises from a gob discharge station into a plurality of female molds seriatim, said female molds disposed around said gob discharge station;

moving each of said molds to one of a plurality of pressing stations, each mold having its own respective pressing station, each of said pressing stations having a plunger;

pressing said formable material into a formed article at each pressing station by moving said plunger at each pressing station into each of said female molds and allowing said glass to cool to a temperature which corresponds to a viscosity of at least $10^8$ poises; and removing said formed article from each of said female molds via said vacuum plunger.

13. The method of claim 12, wherein said removing step comprises retracting said plungers from said molds, and each of said plungers retain said article thereon to thereby remove said article from each of said molds.

14. The method of claim 13, wherein said plunger further comprises a movable ring member movably attached thereto, and said pressing step comprises pressing said formable material within a mold cavity defined by said ring member, said plunger, and said plunger.

15. The method of claim 13, wherein said removing step comprises maintaining said ring member and said plunger in contact with said formed article.

16. The method of claim 15, further comprising lowering said ring member relative to said plunger to thereby remove said formed article from said plunger.

17. The method of claim 12, wherein said depositing formable material step comprises depositing a glass or glass-ceramic material at a viscosity of less than about $10^5$ poises, and said pressing step comprises allowing said glass to cool temperature which corresponds to a viscosity of at least about $10^8$.

18. The method of claim 16, wherein said removing step comprises maintaining said plunger at a temperature which is at least 25° C. higher than said mold.

19. A method of forming a glass, ceramic, or glass-ceramic article by pressing which comprises:

depositing formable glass, ceramic, or glass-ceramic material into a female mold;

moving said mold to a pressing station and into alignment with a plunger;

pressing said formable material into a formed article by moving said plunger into said female and maintaining said plunger until the glass has cooled to a temperature which corresponds to a viscosity of at least about $10^7$, said pressing step comprising maintaining said plunger at a temperature which is greater than the mold; and retracting said plunger from said mold, said plunger retaining said article thereon by vacuum means to thereby remove said article from said mold.

20. The method of claim 19, wherein said pressing step comprises pressing said formable material into a formed article by moving said plunger into said female and maintaining said plunger until the glass has cooled to a temperature which corresponds to a viscosity of at least about $10^8$.

21. The method of claim 19, wherein said plunger is kept at least 25° C. higher than said mold.

22. The method of claim 19, wherein said plunger is kept at least 50° C. higher than said mold.

23. A method of forming a glass ceramic, or glass-ceramic article by pressing which comprises:

depositing formable glass, ceramic, or glass-ceramic material into a female mold;

moving said mold to a pressing station and into alignment with a plunger which comprises vacuum means thereon for aiding in retaining said article to said plunger;

pressing said formable material into a formed article by moving said plunger into said female mold; and applying vacuum from said plunger and retracting said plunger from said mold, said plunger retaining said article thereon to thereby remove said article from said mold, said vacuum means facilitating said retaining of said article.

* * * * *